(12) United States Patent
Jetzinger et al.

(10) Patent No.: US 12,179,398 B2
(45) Date of Patent: Dec. 31, 2024

(54) INJECTION UNIT FOR A MOULDING MACHINE AND METHOD FOR INJECTING A PLASTICIZED MASS

(71) Applicant: ENGEL AUSTRIA GmbH, Schwertberg (AT)

(72) Inventors: Walter Jetzinger, Ernsthofen (AT); Klaus-Dieter Hof, Drolshagen (DE); Herbert Zeidlhofer, Haag (AT)

(73) Assignee: ENGEL AUSTRIA GmbH, Schwertberg (AT)

( * ) Notice: Subject to any disclaimer, the term of this patent is extended or adjusted under 35 U.S.C. 154(b) by 157 days.

(21) Appl. No.: 17/356,893

(22) Filed: Jun. 24, 2021

(65) Prior Publication Data

US 2021/0402658 A1 Dec. 30, 2021

(30) Foreign Application Priority Data

Jun. 25, 2020 (AT) ............... A 50539/2020

(51) Int. Cl.
*B29C 45/13* (2006.01)
*B29C 45/54* (2006.01)
*B29C 45/58* (2006.01)

(52) U.S. Cl.
CPC ............ *B29C 45/13* (2013.01); *B29C 45/54* (2013.01); *B29C 45/581* (2013.01); *B29C 2045/583* (2013.01)

(58) Field of Classification Search
CPC .. B29C 45/16; B29C 45/13; B29C 2045/1685
See application file for complete search history.

(56) References Cited

U.S. PATENT DOCUMENTS

| 5,306,129 A | 4/1994 | Ibar |
| 5,443,378 A | 8/1995 | Jaroschek et al. |
| 5,494,426 A | 2/1996 | Ibar |
| 5,543,092 A | 8/1996 | Ibar |

(Continued)

FOREIGN PATENT DOCUMENTS

| AT | 521056 | 10/2019 |
| DE | 37 12 325 | 10/1988 |

(Continued)

OTHER PUBLICATIONS

Machine translation KR101835704B1 (Year: 2018).*
Machine translation JP2003191280A (Year: 2003).*

*Primary Examiner* — Jacob T Minskey
*Assistant Examiner* — Ayne K. Swier
(74) *Attorney, Agent, or Firm* — Wenderoth, Lind & Ponack, L.L.P.

(57) ABSTRACT

An injection unit for a moulding machine includes an injection cylinder, and an injection piston is provided in the injection cylinder. During an injection process, the injection piston is configured to push out a plasticized mass—in particular plasticized plastic—from the injection cylinder and to feed it to a moulding tool via an injection nozzle. At least two plasticizing units and two supply channels are provided, and the at least two plasticizing units can be fluidically connected with the injection nozzle by the supply channels. The at least two plasticizing units are configured to supply the injection cylinder with the plasticized mass via the supply channels and the injection nozzle prior to the injection process.

24 Claims, 5 Drawing Sheets

(56) References Cited

U.S. PATENT DOCUMENTS

| | | | |
|---|---|---|---|
| 5,605,707 A | 2/1997 | Ibar | |
| 5,650,104 A | 7/1997 | Ibar | |
| 6,074,190 A | 6/2000 | Nagaoka et al. | |
| 6,468,464 B1 | 10/2002 | Eckardt et al. | |
| 6,555,041 B1 | 4/2003 | Nagaoka et al. | |
| 9,610,720 B2 | 4/2017 | Koch et al. | |
| 2006/0125148 A1* | 6/2006 | Keir | B29C 45/706 264/334 |
| 2014/0023744 A1* | 1/2014 | Belzile | B29C 45/02 425/550 |
| 2015/0273746 A1 | 10/2015 | Koch et al. | |
| 2017/0210046 A1* | 7/2017 | Pereira Da Silva Araujo | B29C 45/1744 |

FOREIGN PATENT DOCUMENTS

| | | | |
|---|---|---|---|
| DE | 39 32 416 | 4/1991 | |
| DE | 197 47 573 | 4/1998 | |
| DE | 199 02 990 | 12/2002 | |
| DE | 20 2009 017 941 | 10/2010 | |
| DE | 10 2014 004 221 | 10/2015 | |
| DE | 10 2019 117 259 | 1/2020 | |
| EP | 0 692 359 | 1/1996 | |
| EP | 1 340 607 | 5/2005 | |
| JP | 2003-191280 | 7/2003 | |
| KR | 101835704 B1 * | 3/2018 | B29C 45/13 |
| WO | 95/11122 | 4/1995 | |
| WO | WO-9819846 A1 * | 5/1998 | B29C 45/263 |
| WO | 2009/103803 | 8/2009 | |

\* cited by examiner

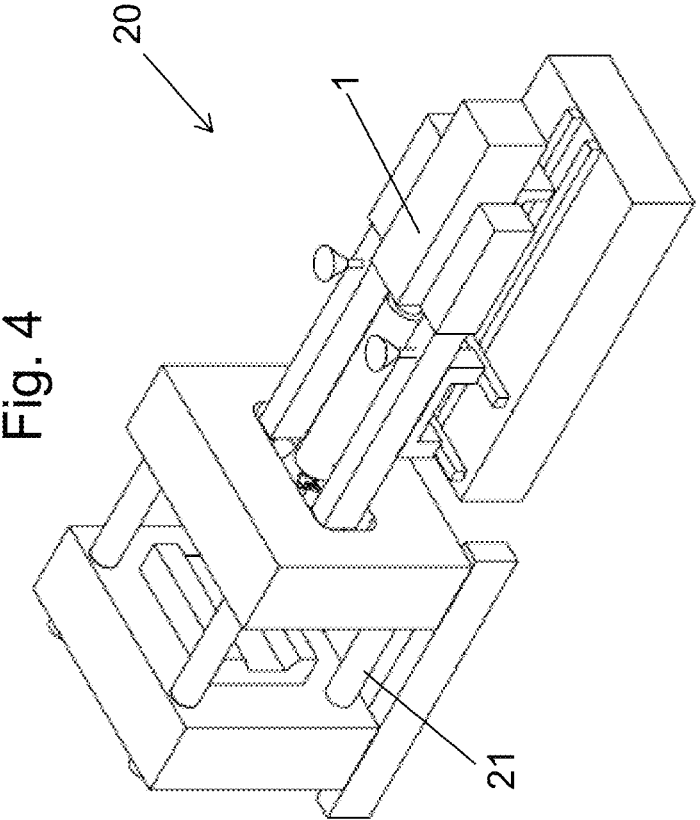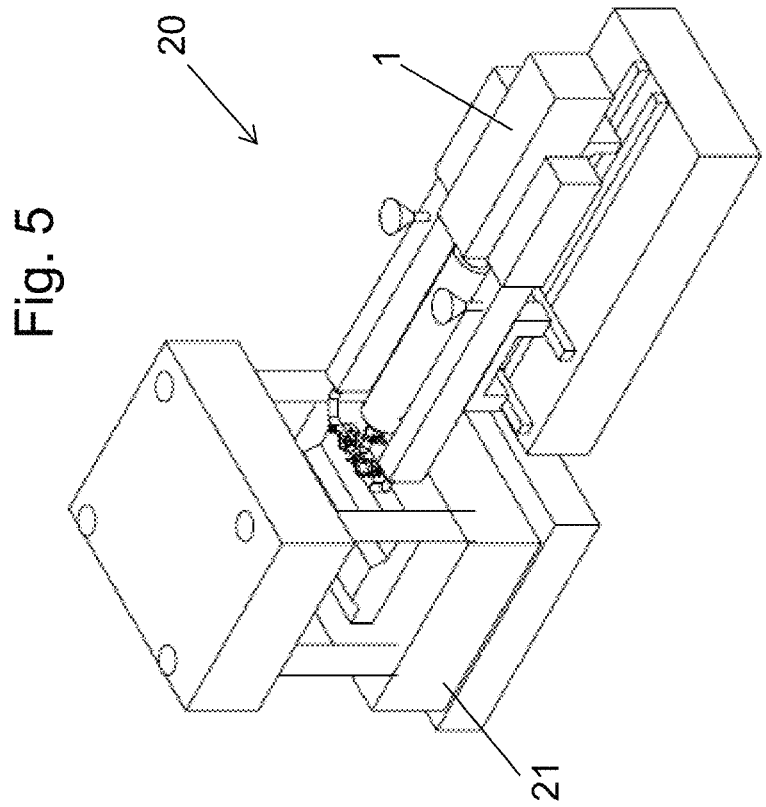

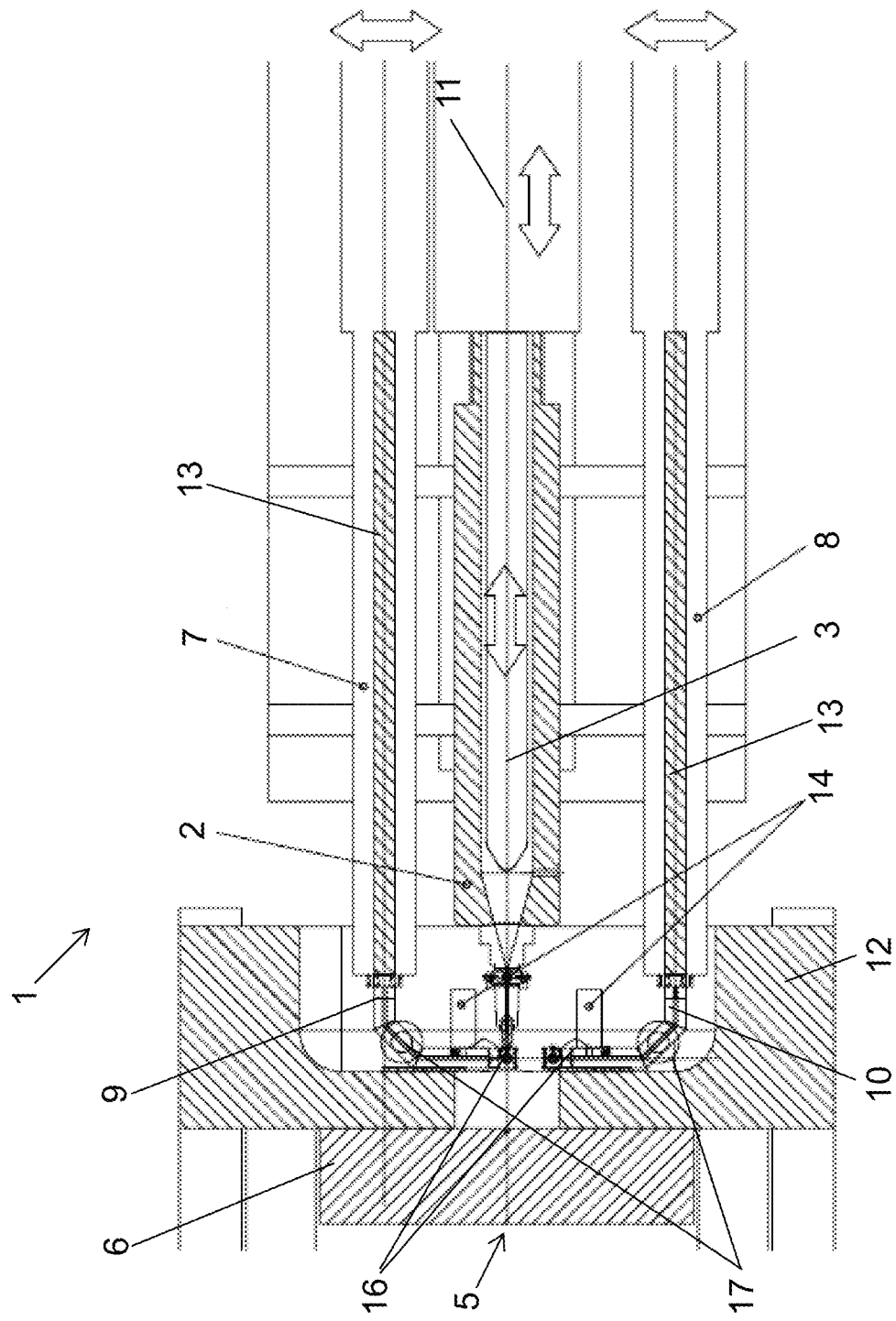

INJECTION UNIT FOR A MOULDING MACHINE AND METHOD FOR INJECTING A PLASTICIZED MASS

BACKGROUND OF THE INVENTION

The present invention relates to an injection unit for a moulding machine, a moulding machine with such an injection unit, and a method for injecting a plasticized mass, in particular plasticized plastic, into a moulding tool of a moulding machine.

Generic injection units for a moulding machine comprise an injection cylinder and an injection piston in the injection cylinder. Within the scope of an injection process, the injection cylinder is configured to push out a plasticized mass from the injection cylinder and to supply it to a moulding tool via an injection nozzle.

In that, moulding machines can mean injection moulding machines, injection presses, presses, and the like. Moulding machines, in which the plasticized mass is fed to an open moulding tool are quite conceivable, too. Hereinafter, the state of the art is to be briefly outlined based on an injection moulding machine. The same applies, of course, to moulding machines in general.

The two-component injection moulding method is a possibility known from the state of the art for applying at least two different plastics for a component to be produced, wherein the plastics monosandwich injection moulding method represents a special case of this two-component injection moulding technology. Such a method is known, for example, from EP 1340607 B1 or AT 521056 B1.

A monosandwich method represents a special case of a two-component injection moulding method, in which a first plasticized plastic forms a core component in the finished moulded part and a second plasticized plastic forms a skin component in the finished moulded part, which surrounds the core component.

For that, normally a primary plasticizing unit is fed plasticized plastic from a secondary plasticizing unit, and subsequently both components are injected from the primary plasticizing unit into a mould cavity of a moulding tool. These plasticizing units are normally formed by plasticizing screws arranged in plasticizing cylinders, which, on the one hand, can plasticize a plastic by a rotational movement and push out the plasticized plastic from the plasticizing cylinder by an axial movement. Upon pushing out the plasticized plastic, this is fed to a mould cavity or another plasticizing screw via an injection nozzle.

These known methods, however, are unsuitable for high shot weights (the infeed of higher masses and weights of plasticized material into a mould cavity), since with the increased plasticized plastic masses, which result from higher shot weights, the dimensioning of the plasticizing screws massively increases, too. This increased dimensioning of plasticizing screws, however, is reflected in likewise massively increased manufacturing costs and massively increased installation spaces, since, in principle, such configurations are not configured for large components to be manufactured and high shot weights.

A further disadvantage of such devices is that with the primary screw, plastic is plasticized as well as injected, which has a disadvantageous effect on the cycle time. Thus, the plasticizing and injecting cycle represents a sequence of plasticizing with the primary plasticizing screw, subsequently filling of the plasticizing screw by a secondary plasticizing screw, and the subsequent injection into a mould cavity from the primary plasticizing screw/primary plasticizing unit. Any shortening of this sequence of events or a simultaneous execution of the same would result in a substantial increase in productivity, since the cycle times would be shortened.

It is known from the state of the art to use injection units with an injection cylinder and an injection piston, which are loaded by plasticizing units and from which a mould cavity of an injection moulding machine is subsequently filled. Such configurations are known, for example, from DE 19902990 C2, DE 19747573 A1, and DE 3932416 A1.

A disadvantage of such configurations, however, is that the separately plasticized plastics are blended in the injection cylinder, whereby a monosandwich injection moulding method cannot be applied, since no skin and core can be formed from the separate plastics. The various materials are blended in the injection cylinder, and there is no separation of the plastics in terms of a core and a skin in the mould cavity.

SUMMARY OF THE INVENTION

Therefore, the object of the invention is to provide an injection unit, a moulding machine with such an injection unit, and a method for injecting, by means of which higher masses or weights can be injected and/or the productivity of the injection unit can be increased and/or the cycle times can be shortened and/or the manufacturing costs can be reduced and/or the manufacturing times or the manufacturing effort of the injection unit is reduced.

According to the invention, at least two plasticizing units are used for supplying an injection cylinder with a plasticized mass, which units supply the injection cylinder with the plasticized mass from the injection nozzle prior to the injection process.

With a configuration according to the invention, an advantageous sequential injection of the plasticized mass delivered by the at least two plasticizing units into a moulding tool—preferably into a mould cavity of a moulding tool—becomes possible.

Thus, for example, the injection cylinder can first be filled by the first plasticizing unit and subsequently by the second plasticizing unit. During the subsequent injection process, naturally, in reverse order, the plasticized mass from the second plasticizing unit is first fed to the moulding tool, which is deposited on the boundary layers or the walls, resp., of the moulding tool. The subsequently-injected plasticized mass from the first plasticizing unit can no longer reach the walls of the moulding tool, since these are already covered with the plasticized mass from the second plasticizing unit, whereby the subsequent plasticized mass from the first plasticizing unit forms a core material on the inside (and thus of the formed moulded part).

This results in the substantial advantage that, for example, materials not visually appealing, as they, for example, result from recycling applications, can be used for the core of a moulded part, whereas for the outer optical appearance of the moulded part a new, for example dyed, material can be used, which completely covers the not so appealing material.

The quite simple configuration of an injection cylinder with an injection piston is linked with simple manufacturing, whereby also with a very large configuration of the injection cylinder, no essentially higher (compared to a plasticizing screw) production costs arise.

Furthermore, the injection piston, contrary to a plasticizing screw, has great advantages to that effect that it can be very easily enlarged in its dimension—more exactly: in its diameter, which is not trivially possible with plasticizing screws due to their geometrical configuration.

Furthermore, with injection cylinders working with injection pistons, far higher masses and/or weights can be injected in the same or a shorter amount of time.

Naturally, separate injection pistons and injection cylinders (also referred to as "shooting pots" or "shot pots") are accompanied by a certain reduction in efficiency, because the plasticized mass in the injection cylinder must be kept under pressure and at temperature. The invention is based on the astounding finding that, at least for very high shot weights, upon using a separate injection cylinder, the disadvantages associated therewith are outweighed by the advantages with regard to cycle time and size requirements to the plasticizing screw.

A further substantial advantage consists in the fact that by means of an injection cylinder according to the present invention, several materials can be fed to a moulding tool in one movement—in a continuous movement, whereby there are no undesired interruptions during the injection cycle, whereby, for example, areas of already hardened material can occur, before a subsequent plasticized mass is delivered at a later date. Such stagnant injections, in which already plasticized material hardens in the moulding tool, before the entire moulding tool is filled, can result in weaknesses, cracks and/or shrink holes across the cross-section of the finished moulded part.

Furthermore, it is possible that the at least two plasticizing units provide plasticized mass for a subsequent injection process during the injection of the injection cylinder already. Thus, the time between two injection processes of the injection cylinder is reduced to a minimum.

As already mentioned, the supply of the injection cylinder according to the invention takes place via the supply channels and the injection nozzle. In that, however, it shall be mentioned that the injection nozzle can be formed in multiple parts, wherein the supply channels debouch between two or more parts of the injection nozzle. In other words, the supply of the injection piston must not take place from the leading tip of the injection nozzle. To put it yet another way, the supply according to the invention must take place via at least one part of the injection nozzle.

Thus, preferably the at least two plasticizing units are each fluidically connectable with the injection nozzle by the supply channels, wherein preferably separate supply channels lead from the at least two plasticizing units to the injection nozzle, particularly preferred to a cavity-side opening of the injection nozzle.

With a separate infeed via respectively one separate supply channel of the at least two plasticizing units into the injection cylinder, mixing during the infeed can be prevented, which (preferably upon formation of a skin and a core material from two different materials) results in increased quality of the subsequently manufactured moulded parts.

In comparison, upon (sequential) infeed from the at least two plasticizing units into the injection cylinder via a common supply channel, the plasticized mass would mix (even though to a small extent only), since residues of a previously fed plasticized mass from a first plasticizing unit would be deposited in the supply channel, which upon subsequent infeed from a second plasticizing unit would mix with the plasticized mass from the second plasticizing unit.

Moulding machines can mean injection moulding machines, injection presses, presses, and the like.

Throughout the present document—whenever a plate is being discussed—a flat, planar plate must not necessarily be assumed. Such a plate can also have depressions and elevations. Versions with ribs for stabilisation or to generate a certain dimensional stability are quite conceivable, too.

Throughout the present document, there is a distinction in the terminology between injection pistons and plasticizing units.

Plasticizing units comprise a plasticizing or extruder screw. Extruder screws are rotationally driven for plasticizing. According to the present terminology used, plasticizing screws additionally comprise a drive for screw advancement, using which plasticized mass can be pushed out from a plasticizing cylinder.

Moulding tools can comprise one mould cavity or several mould cavities, into which the plasticized mass is introduced.

Moulding machines, in which the plasticized mass is fed to an open moulding tool, are quite conceivable, too.

The wording "injection pistons" shall mean pistons, which are arranged in an injection cylinder and displace a fluid therefrom by an axial movement. An injection piston comprises a closed projecting surface towards the longitudinal axis of the injection unit, which interfaces with the inside of the injection cylinder, and can be mounted in the injection cylinder in an axially movable fashion. Plasticizing screws, which are equipped without a closed, projecting surface (but, for example, only with a screw surface), shall not be understood as injection pistons. Simply put, a projecting surface of a screw always comprises an opening between screw and plasticizing cylinder in the longitudinal direction.

An injection piston is provided for injection and does not perform plasticizing.

Throughout the present document, the term "fluid" shall also mean a plasticized mass.

Materials fed to the plasticizing units can include, for example, plastics, fibre materials, additives, fillers, blowing agents for foamed plastics, "wood" compounds, or the like, wherein the plasticized mass is formed from these materials.

For the supply of the injection cylinder, various elements, such as sliders, switches, valves, and the like, can be used to closed-loop/open-loop control or temporarily interrupt the desired mass flows.

Several plasticizing units can be provided, too, wherein any number of layers can be formed in the injection cylinder, which are reflected as layers in the finished moulded part.

A closed-loop or open-loop control device is provided, which preferably is configured to closed-loop or open-loop control the at least two plasticizing units for sequentially supplying the injection cylinder. The injection cylinder can be sequentially supplied by the at least two plasticizing units prior to any injection process, or the supply takes place alternatingly by another plasticizing unit after each injection process. Thus, for example, one plasticizing unit can supply the injection cylinder, this injection cylinder injects the plasticized mass, and subsequently the other plasticizing unit fills the plasticizing cylinder.

The injection cylinder can be movable between two positions by a moving device—preferably along a longitudinal axis of the injection unit, wherein
  in a first position, the injection cylinder is fluidically connected with a moulding tool—preferably a mould cavity of a moulding tool, preferably the injection nozzle is indirectly or directly pressed against a moulding tool or a stationary mould clamping plate, and/or
  in a second position, the injection cylinder is fluidically connected with at least one of the at least two plasticizing units.

Preferably, the moving device comprises a linear drive, preferably a piston-cylinder unit.

Alternatively, or in addition to that, a spindle drive is included.

The at least two plasticizing units can comprise at least one drive, which at least one drive is configured to fluidically connect the plasticizing unit with the injection nozzle by a movement of the plasticizing unit—preferably transverse to the longitudinal axis of the injection cylinder.

At least one—preferably each—of the at least two plasticizing units can comprise a plasticizing screw.

Alternatively, or in addition to that, at least one—preferably each—of the at least two plasticizing units can comprise an extruder.

At least one of the at least two plasticizing units can comprise a recycling device.

A recycling device shall mean plasticizing units which are configured to process recycled plastic. More precisely, it shall mean that plastic is recycled by these plasticizing units. In that, preferably plastics are plasticized, which had already been in use, and are once again supplied to an application as a raw material for a moulded part.

A recycling device can include devices for shredding and degassing of plastics to be recycled.

At least one—preferably each—of the at least two plasticizing units can comprise a melt reservoir.

As melt reservoirs, volumes shall be understood, which can be arranged between plasticizing unit and injection nozzle (of the injection cylinder), and which are configured to temporarily store a plasticized mass.

Thus, during the injection process, for example, at least one plasticizing unit continues to plasticize and temporarily stores this plasticized mass in the melt reservoir, until the injection cylinder is connected and the stored plasticized mass from the melt reservoir can be transferred into the injection cylinder. In particular, in case of an application with plasticizing units having an extruder, this has the advantage that the extruder can continuously plasticize without interruption. During the injection process (and/or a pressure operation), the plasticized mass is temporarily stored in the melt reservoir, and is passed on to the injection cylinder in the subsequent supply process.

The at least one first supply channel and/or the at least one second supply channel can respectively form one melt reservoir with valves and/or diverter valves, or the like. These can be particularly preferred embodiments, because, by temporarily storing plasticized mass in the intermediate reservoirs thus created during the injection process, the supply of the injection cylinder can be started again very quickly after the end of the injection process. In this manner, the advantage according to the invention (better scaling of productivity towards higher shot weights) can be enhanced even further.

Preferably, at least one—preferably each—of the at least two plasticizing units is arranged substantially in parallel to the injection cylinder. A substantially parallel arrangement shall be understood as including slight inclinations of up to 10°, preferably 5°, particularly preferred 2°, or inclinations, which merely result due to manufacturing tolerances. However, versions are quite conceivable, too, in which at least one—preferably each—of the at least two plasticizing units is arranged at any angle to the injection cylinder.

At least two different materials are plasticized and fed to the injection cylinder. I.e., the plasticized mass can consist of several—preferably spatially separated—materials.

The plasticized mass according to the invention can then also be understood as several plasticized masses.

Preferably, the injection cylinder is sequentially supplied by the at least two plasticizing units prior to the injection process.

BRIEF DESCRIPTION OF THE DRAWINGS

Further details and embodiments of the invention are apparent from the figures as well as the associated description of the figures, in which:

FIG. 4 illustrates a first embodiment of a moulding machine according to the invention, FIG. 5 illustrates a second embodiment of a moulding machine according to the invention, FIG. 6 illustrates a further embodiment according to the invention.

DETAILED DESCRIPTION OF THE INVENTION

Figure 1:
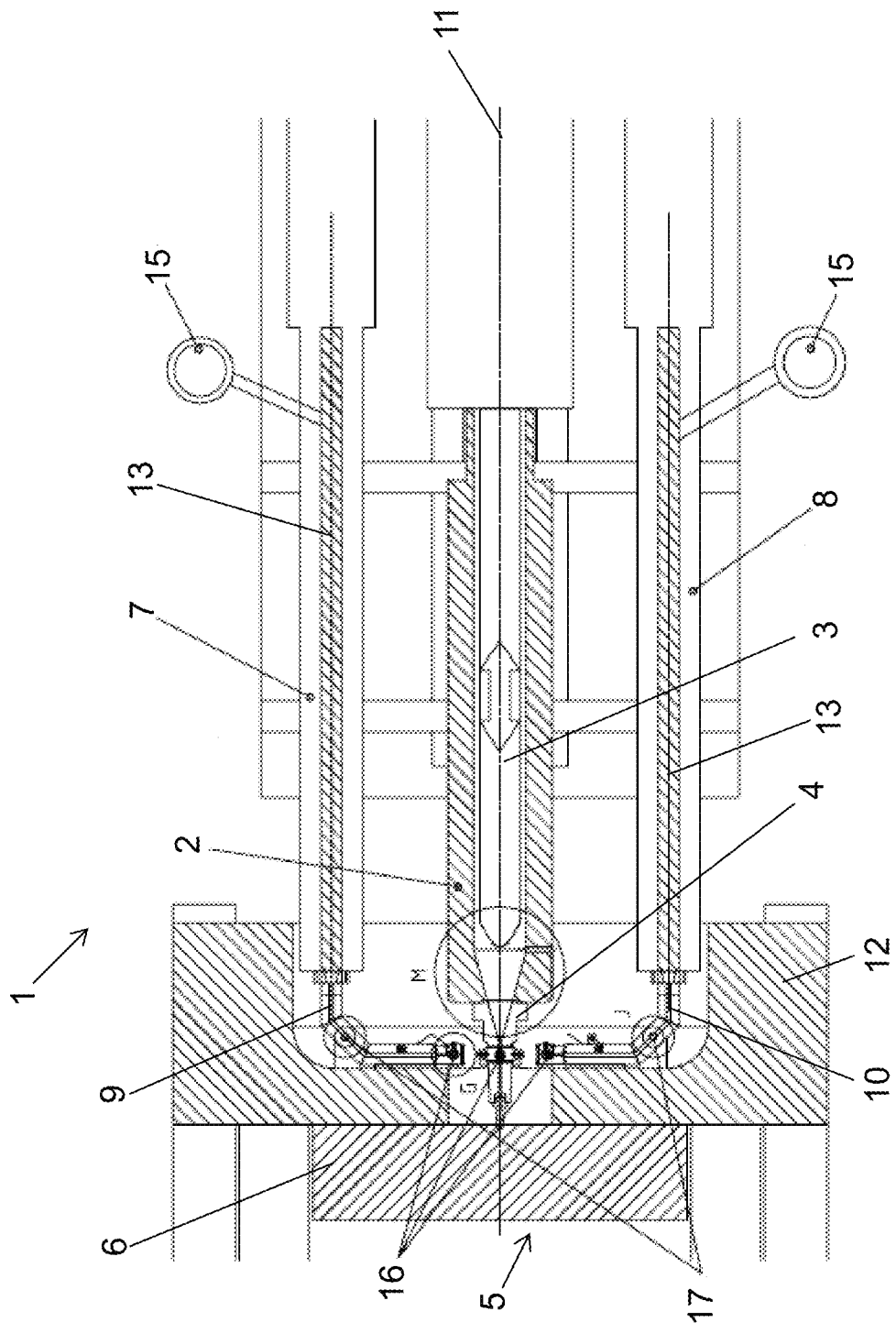
FIG. 1 illustrates a first embodiment according to the invention.

FIG. 1 illustrates a first embodiment of an injection unit 1 according to the invention. The injection unit 1 of this embodiment comprises an injection cylinder 2, in which an injection piston 3 is movably mounted along the longitudinal axis 11 of the injection unit 1.

Via an injection nozzle 4, a plasticized mass can be injected from the injection cylinder 2 into a mould cavity 5 of the moulding tool 6 by means of the injection piston 3.

In this embodiment, the moulding tool 6 is arranged at a stationary mould clamping plate 12.

A first plasticizing unit 7 and a second plasticizing unit 8 are provided for plasticizing the material. In this embodiment, the first plasticizing unit 7 and the second plasticizing unit 8 are arranged in parallel to the injection cylinder 2.

The first plasticizing unit 7 and the second plasticizing unit 8 respectively comprise a plasticizing screw 13 arranged in a cylinder, which plasticizes material—for example plastic granules—fed via the feeding devices 15 and can feed it to the injection cylinder 2 via the first supply channel 9 and the second supply channel 10.

Figure 2:
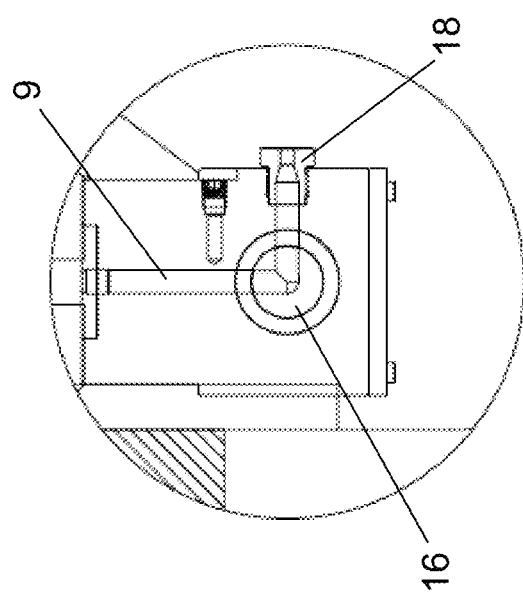
FIG. 2 is a detailed view from FIG. 1.

The enlarged rotary slide valve 16 of FIG. 1 shown in FIG. 2 can be utilized to shut off the first supply channel 9 in front of the connecting flange 18 shown by rotating the rotary slide valve 16.

When the injection nozzle 4 of the plasticizing unit 7, 8 is lifted off from the connecting flange 18 and is not fluidically connected therewith—this rotary slide valve 16 can be used to shut off the supply channel 9, 10, so that plasticized mass cannot exit in an uncontrolled manner.

Thus, the plasticizing units 7, 8 continue working during the injection of the injection cylinder 2 and plasticized mass for the next work cycle is already being prepared during the injection.

Figure 3:
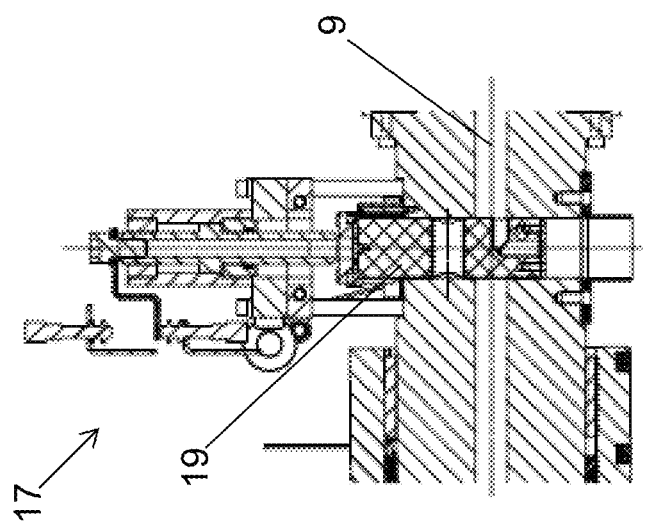
FIG. 3 is a further detailed view from FIG. 1.

Furthermore, with the diverter valve 17 (of FIG. 1), shown enlarged in FIG. 3, the supply channels 9, 10 can be shut off in front of the plasticizing units 7, 8 or part of the material plasticized by the plasticizing units 7, 8 is diverted, resp.

This diverter valve 17 can guide the material flow outside, before the material enters into the injection cylinder 2.

The advantage of this diverter valve consists in the fact that upon using compounded material or recycled material, the material quality can be set as best as possible upon starting up the moulding process, and only when this is guaranteed (by material testing at the exit of the diverter valve 17), a switchover into the actual production operation can be performed.

Furthermore, in case of a/an (brief) interruption of production (incident), plasticized material can exit by opening the diverter valve 17, so that no inadmissible pressure builds up or no other disruptions occur. Then, there can be a very fast switchover back to the production sequence, without having to put the plasticizing units 7, 8 into standstill during the disruption.

The embodiments according to the invention can be used for different moulding machines 20.

Thus, for example, the embodiment of FIG. 1 is illustrated in FIG. 4 for a moulding machine 20 with a horizontal clamping unit 21.

In FIG. 5, the embodiment of FIG. 1 is combined with a vertical clamping unit 21 for a moulding machine 20.

FIG. 6 illustrates a similar embodiment as FIG. 1 already does, wherein a melt reservoir 14 is respectively provided along the supply channels 9, 10, which reservoir can be shut off in the direction of the injection nozzle 4 by the rotary slide valve 16 (illustrated in more detail in FIG. 2) and in the direction of the plasticizing unit 7, 8 by means of a diverter valve 17 (illustrated in more detail in FIG. 3).

These melt reservoirs 14 are volumes, which are arranged between the plasticizing units 7, 8 and the injection nozzle 4 (of the injection cylinder 2) and are configured to temporarily store a plasticized mass.

Thus, it is possible that, for example, at least one plasticizing unit 7, 8 continues plasticizing during the injection process, and this plasticized mass is temporarily stored in the melt reservoir 14, until the injection cylinder 2 is connected and the stored plasticized mass can be transferred from the melt reservoir 14 into the injection cylinder 2.

In particular in case of applications with plasticizing units 7, 8 having an extruder, this has the advantage that the extruder can continuously plasticize without interruption.

During the injection process, the plasticized mass is temporarily stored in the melt reservoir 14, and is then passed on to the injection cylinder 2 in the subsequent supply process.

Figure 7:
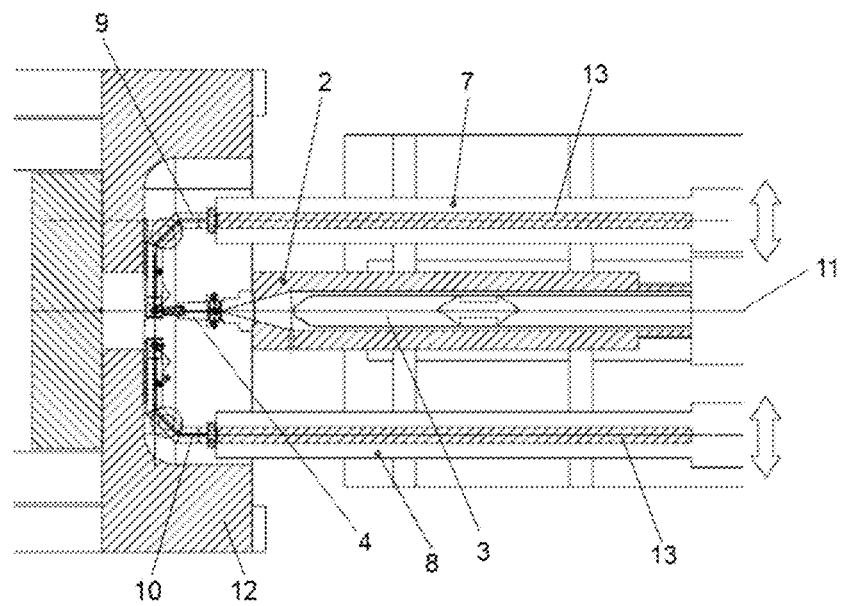
FIG. 7-9 illustrate an injection process of an injection unit according to the invention.
Figure 8:
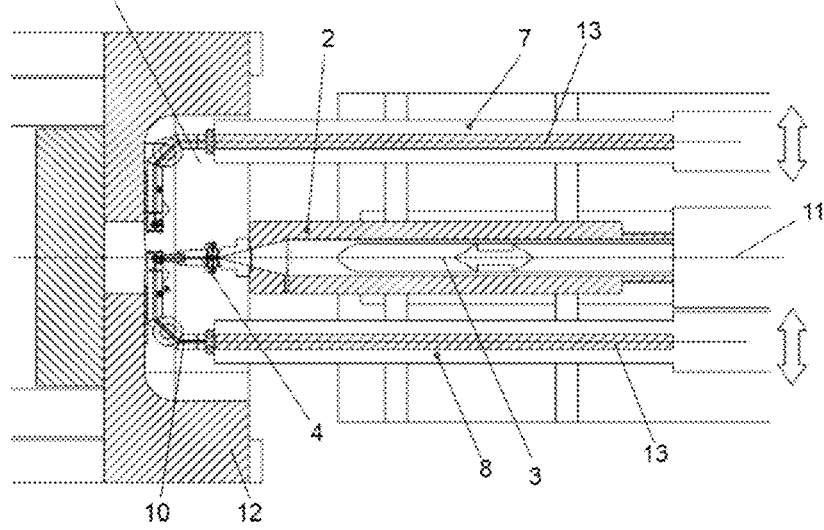
Figure 9:
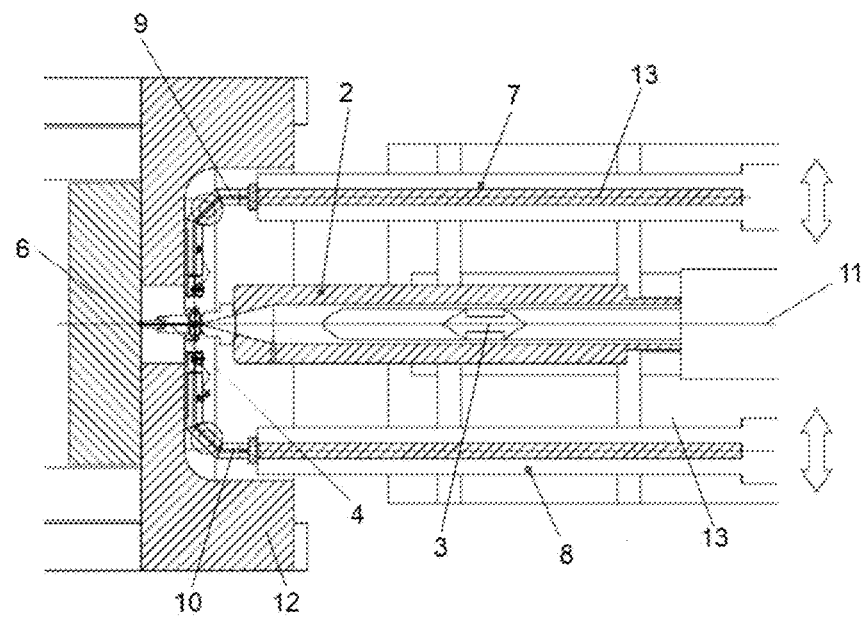

FIGS. 7 to 9 illustrate an injection process of an embodiment of an injection unit 1 according to the invention (the embodiment of FIG. 1).

In a first step (illustrated by FIG. 7), the injection cylinder 2 is moved away from the moulding tool 6 along the longitudinal axis 11 of the injection unit 1 and the first plasticizing unit 7 is displaced transverse thereto, so that the injection nozzle 4 lies against a previously described connecting flange 18 of the first plasticizing unit 7 (or is pressed against it).

With the fluidical connection between the first plasticizing unit 7 and the injection cylinder 2 thus generated, plasticized mass from the plasticizing unit 7 can now be transferred into the injection cylinder 2 by pushing out plasticized mass with the plasticizing screw 13 of the first plasticizing unit 7 and simultaneously retracting the injection piston 3, so that the injection cylinder 2 is gradually filled.

Once a defined quantity of plasticized mass from the first plasticizing unit 7 was fed to the injection cylinder 2, the first plasticizing unit 7 can be distanced from the injection cylinder 2 transverse to the longitudinal axis 11, and the second plasticizing unit 8 can approach the injection cylinder 2 transverse to the longitudinal axis 11.

As illustrated by FIG. 8, now, plasticized mass can be fed to the injection cylinder 2 from the second plasticizing unit 8 in the same manner, whereby a second area is formed in the injection cylinder 2 with a plasticized mass from the second plasticizing unit 8.

Once a defined quantity of plasticized mass from the second plasticizing unit 8 has been fed, too, the second plasticizing unit 8 can now be distanced from the injection cylinder 2 transverse to the longitudinal axis 11, and the injection cylinder 2 can be approached to the moulding tool 6, or more precisely, the injection nozzle 4 can be pressed against the moulding tool 6.

With a movement of the injection piston 3 along the longitudinal axis 11 of the injection unit 1, the plasticized masses can now be pushed out from the injection cylinder 2 and via the injection nozzle 4 fed to a mould cavity 5 of the moulding tool 6 (as illustrated by FIG. 8).

With a respective embodiment, as shown by the figures, a core material is generated by the first plasticizing unit 7 and then fed to the injection cylinder 2, whereas a skin material is generated by the second plasticizing unit 8 and then fed to the injection cylinder 2.

However, configurations are also quite conceivable, in which even further plasticized masses from further plasticizing units are fed via the injection nozzle 4, whereby several layers (for example, a layered structure) of a finished moulded part can be generated.

LIST OF REFERENCE SIGNS

1 Injection unit
2 Injection cylinder
3 Injection piston
4 Injection nozzle
5 Mould cavity
6 Moulding tool
7 First plasticizing unit
8 Second plasticizing unit
9 First supply channel
10 Second supply channel
11 Longitudinal axis of the injection unit
12 Stationary mould clamping plate
13 Plasticizing screw
14 Melt reservoir
15 Feeding device
16 Rotary slide valve
17 Diverter valve
18 Connecting flange
19 Switch
20 Moulding machine
21 Clamping unit

The invention claimed is:

1. An injection unit for a moulding machine comprising:
an injection cylinder;
an injection piston in the injection cylinder, the injection piston being configured to push out a plasticized mass from the injection cylinder and to feed it to a moulding tool via an injection nozzle;
at least two supply channels; and
at least two plasticizing units configured to be fluidically connected with the injection nozzle by the at least two supply channels, the at least two plasticizing units being further configured to supply the plasticized mass to the injection cylinder via the at least two supply channels and the injection nozzle prior to the injection process.

2. The injection unit according to claim 1, further comprising a closed-loop or open-loop control device.

3. The injection unit according to claim 1, further comprising a moving device configured to move the injection cylinder is movable-between two positions,
wherein the injection unit is configured such that:
in a first position, the injection cylinder is fluidically connected with a moulding tool, and/or
in a second position, the injection cylinder is fluidically connected with at least one of the at least two plasticizing units.

4. The injection unit according to claim 3, wherein the moving device comprises a linear drive.

5. The injection unit according to claim 1, wherein the at least two plasticizing units comprise a drive, the drive being configured to fluidically connect the at least two plasticizing units with the injection nozzle by moving the at least two plasticizing units.

6. The injection unit according to claim 1, wherein at least one—of the at least two plasticizing units comprises a plasticizing screw.

7. The injection unit according to claim 1, wherein at least one of the at least two plasticizing units comprises a recycling device.

8. The injection unit according to claim 1, wherein at least one—of the at least two plasticizing units comprises a melt reservoir.

9. The injection unit according to claim 1, wherein at least one—of the at least two plasticizing units is arranged substantially parallel to the injection cylinder.

10. A moulding machine comprising the injection unit according to claim 1.

11. A method for injecting a plasticized mass—into a moulding tool of a moulding machine, the method comprising:
pushing the plasticized mass out from an injection cylinder by an injection piston and is feeding the plasticized mass to the moulding tool via an injection nozzle; and
supplying the injection cylinder with the plasticized mass using at least two plasticizing units fluidically connected with the injection nozzle by at least two supply channels, the at least two plasticizing units supplying the plasticized mass to the injection cylinder via the at least two supply channels and the injection nozzle prior to the injection process.

12. The method according to claim 11, wherein the at least two plasticizing units,-plasticize and feed at least two different materials to the injection cylinder as the plasticized mass.

13. The method according to claim 11, wherein the supplying of the injection cylinder with the plasticized mass comprises sequentially supplying the injection cylinder using the at least two plasticizing units prior to the injection process.

14. The injection unit according to claim 1, wherein the plasticized mass is a plasticized plastic.

15. The injection unit according to claim 2, wherein the control device is configured to closed-loop or open-loop control the at least two plasticizing units to sequentially supply the injection cylinder with the plasticized mass from each of the at least two plasticizing units.

16. The injection unit according to claim 3, wherein the moving device is configured to move the injection cylinder between the two positions along a longitudinal axis of the injection unit, and the injection nozzle is configured to be indirectly or directly pressed against a moulding tool and/or a stationary mould clamping plate in the first position.

17. The injection unit according to claim 4, wherein the linear drive is a piston-cylinder unit.

18. The injection unit according to claim 5, wherein the drive is configured to fluidically connect the at least two plasticizing units with the injection nozzle by moving the at least two plasticizing units in a direction transverse to the longitudinal axis of the injection cylinder.

19. The injection unit according to claim 6, wherein each of the at least two plasticizing units comprises a respective plasticizing screw.

20. The injection unit according to claim 8, wherein each of the at least two plasticizing units comprises a respective melt reservoir.

21. The injection unit according to claim 9, wherein each of the at least two plasticizing units is arranged substantially parallel to the injection cylinder.

22. The method according to claim 11, wherein the plasticized mass is a plasticized plastic.

23. The injection unit according to claim 1, further comprising a drive configured to fluidically connect each of the at least two plasticizing units with the injection nozzle in sequence by first moving a first one of the at least two plasticizing units in a direction transverse to the longitudinal axis of the injection cylinder to fluidically connect the first one of the at least two plasticizing units with the injection nozzle while a second one of the at least two plasticizing units is not fluidically connected to the injection nozzle, and then moving the second one of the at least two plasticizing units in a direction transverse to the longitudinal axis of the injection cylinder to fluidically connect the second one of the at least two plasticizing units with the injection nozzle while the first one of the at least two plasticizing units is not fluidically connected to the injection nozzle.

24. The method according to claim 11, wherein the supplying of the injection cylinder with the plasticized mass comprises using a driver to move each of the at least two plasticizing units in sequence by first moving a first one of the at least two plasticizing units in a direction transverse to the longitudinal axis of the injection cylinder to fluidically connect the first one of the at least two plasticizing units with the injection nozzle while a second one of the at least two plasticizing units is not fluidically connected to the injection nozzle, and then moving the second one of the at least two plasticizing units in a direction transverse to the longitudinal axis of the injection cylinder to fluidically connect the second one of the at least two plasticizing units with the injection nozzle while the first one of the at least two plasticizing units is not fluidically connected to the injection nozzle.

\* \* \* \* \*